No. 776,952. PATENTED DEC. 6, 1904.
R. V. SKOWRONEK.
PROCESS OF SECURING METAL COVERINGS UPON PIPES.
APPLICATION FILED FEB. 27, 1902.
NO MODEL.
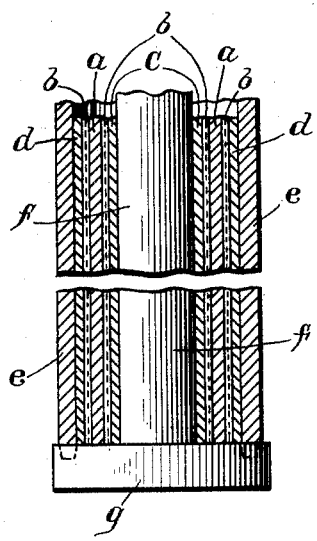
Witnesses
T. P. Britt
Geo. Heinicke
Inventor
Richard V. Skowronek
By G. Dittmar
Attorney

UNITED STATES PATENT OFFICE.

RICHARD VICTOR SKOWRONEK, OF ZWICKAU, GERMANY.

PROCESS OF SECURING METAL COVERINGS UPON PIPES.

SPECIFICATION forming part of Letters Patent No. 776,952, dated December 6, 1904.

Application filed February 27, 1902. Serial No. 96,005. (No model.)

*To all whom it may concern:*

Be it known that I, RICHARD V. SKOWRONEK, a subject of the Emperor of Germany, residing at Zwickau, Saxony, Germany, have invented a new and useful Process of Securing Metal Coverings upon Pipes, of which the following is a specification.

In covering pipes with a lining of metal it has been heretofore the practice to firmly combine the metals of the lining and the pipe by soldering the same to the pipe. This method has several inconveniences. There are always spots where the combination of the metals is not complete on account of the solder forming vapors which prevent a perfect union of the metals, and, moreover, when the temperature rises above the heat best suitable for the process, which is sometimes impossible to prevent, the solder permeates the coating of the outer metal.

The present invention relates to a process for combining the metal of a pipe with an outer coating or for combining two pipes, one being inserted into the other, in which the soldering is dispensed with.

In carrying out my invention I first subject the pipe, either inside or outside, or both, to electrolytic action, whereby an inner or outer, or both inner and outer, coating of a different metal is deposited upon said pipe. Should it be desired to secure a coating or cover upon the outside of the pipe, only the outside will be provided with an electrolytic deposit, and the outer pipe is then placed upon the pipe to be covered, with the metal of the outer pipe in close contact with an electrolytic deposit. Should it be desired to insert a pipe within the first pipe, then the electrolytic deposit will be made upon the inside, and a pipe of the proper diameter is inserted into the first-named pipe with its outer surface in close contact with the inner coating of electrolytic deposit. Should it, however, be desired to cover an ordinary pipe on the outside and to insert and secure a pipe on the inside thereof, the original pipe will be coated electrolytically both inside and out, a pipe placed upon it with its inner surface in contact with the outer coating, and a second pipe placed within it with its outer surface in contact with the inner coating. The original pipe thus prepared with an outer or inner pipe, or both, to be secured thereto is inclosed in a shell or covering of any suitable material, preferably of a suitable metal, said shell being tightly closed at one end, and a suitable core, preferably of a suitable metal, is placed within the inner pipe. The open end of the shell is now closed and the whole structure exposed to the heat of a furnace or other suitable apparatus, whereby the inclosed pipes to be united are heated to a sufficiently-high degree to cause the coating or coatings to fuse and firmly unite the adjacent surfaces to each other. After cooling, the outer shell is opened or removed, and the core also is removed by any suitable means.

In the accompanying drawing I have shown, as an example, a mold with a pipe inserted therein, having its inner surface, as well as the outer surface, lined with a softer metal.

$a$ is the pipe. The dotted lines $b$ indicate the electrolytic deposit on the inner surface and the outer surface. $c$ is the inner lining, and $d$ the outer lining, of a metal having a lower fusing-point.

$e$ is the outer shell of the mold, which may be made in two parts, jointed longitudinally, or which may have the shape of a tube. This outer shell and the pipe, with the linings, are shown in cross-sections.

$f$ is a cylindrical inner core, preferably in one piece, with a base $g$, which may be grooved near its periphery to snugly receive the foot end of the outer shell $e$, as indicated in dotted lines.

In executing the process the greatest variety of metals may be used as the lining for pipes having a higher fusing-point. The temperature and length of time will vary according to the metals employed. If, for instance, an iron pipe should be lined with lead, it would be practical to use copper as the electrolytic deposit. This and the iron will resist to the temperature necessary for fusing the lead covering, and the liquid lead will easily combine with the deposit of copper.

By this process an absolutely perfect combination of the coating metal or cover-pipe with the metal of the original pipe is obtained, extending throughout the surface thereof, so that the joined pipe presents the appearance of being made of a single metal. No soldering in the usual sense is necessary, and no machinery or apparatus for pressing or drawing the covering over the pipe or the pipe over the core is required, thereby greatly reducing the labor and expense of the process and providing an improved product.

Having thus fully described my invention, what I claim as new, and desire to protect by Letters Patent of the United States, is—

Process of combining metal pipes melting at a high temperature with a lining of a metal melting at a lower temperature, which consists in forming a galvanoplastic deposit upon the surface to be covered, then applying against said surface the lining in the shape of a pipe, then placing the whole vertically in a mold adopted to inclose the lining metal fully and snugly and prevent it from leaking out when fused, then placing the mold vertically in an oven and heating it with the pipes sufficiently so as to fully melt the metal forming the lining, then allowing to cool and finally removing the mold substantially as described.

In testimony whereof I affix my signature.

RICHARD VICTOR SKOWRONEK.

In presence of—
H. THIELE,
FREDERICK J. DIETZMAN.